United States Patent [19]

Murphy

[11] Patent Number: 5,795,025
[45] Date of Patent: Aug. 18, 1998

[54] RETRACTABLE ARMREST FOR AN AIRCRAFT SEAT

[75] Inventor: Patrick Murphy, Miami, Fla.

[73] Assignee: Aircraft Modular Products, Inc., Miami, Fla.

[21] Appl. No.: 708,029

[22] Filed: Aug. 30, 1996

[51] Int. Cl.$^6$ .............................. A47C 7/54; B60N 2/46
[52] U.S. Cl. .......................... 297/411.36; 297/411.31; 297/115
[58] Field of Search .................... 297/411.36, 411.35, 297/411.3, 411.31, 410, 115, 188.16 R

[56] References Cited

U.S. PATENT DOCUMENTS

| | | | |
|---|---|---|---|
| 4,145,020 | 3/1979 | Webster | 297/411.3 |
| 4,176,878 | 12/1979 | Koutsky | 297/115 |
| 4,186,456 | 2/1980 | Huempfner | 297/411.36 |
| 4,659,135 | 4/1987 | Johnson | 297/411.36 |
| 4,968,094 | 11/1990 | Froyland et al. | 297/411.39 |
| 5,050,933 | 9/1991 | Tornero et al. | 297/411.36 |
| 5,383,704 | 1/1995 | Granados et al. | 297/411.36 |
| 5,547,248 | 8/1996 | Marechal | 297/188.16 |

Primary Examiner—Peter M. Cuomo
Assistant Examiner—Anthony D. Barfield
Attorney, Agent, or Firm—Malloy & Malloy, P.A.

[57] ABSTRACT

An improved, retractable armrest for an aircraft seat having a mount assembly being fixedly secured to a frame of the aircraft seat and a retraction assembly structured to move along a path in a generally vertical plane relative to the mount assembly and the aircraft seat. The retraction assembly includes a generally horizontal support with at least one guide element extending downwardly therefrom to engage a guide member of the mount assembly and guide vertical movement of the retraction assembly between an extended position and a retracted position. The retraction assembly is structured to lock for securely maintaining the retraction assembly in the extended position, while being capable of being released by a gentle yet focused lifting force being applied to the retraction assembly when in the extended position. Further, the retraction assembly is structured such that a slight, momentary upward movement does not cause an accidental release thereof from the extended position, such as might otherwise occur when a passenger manipulates one or more various controls located on the armrest for activating other comfort features on the aircraft seat.

17 Claims, 3 Drawing Sheets

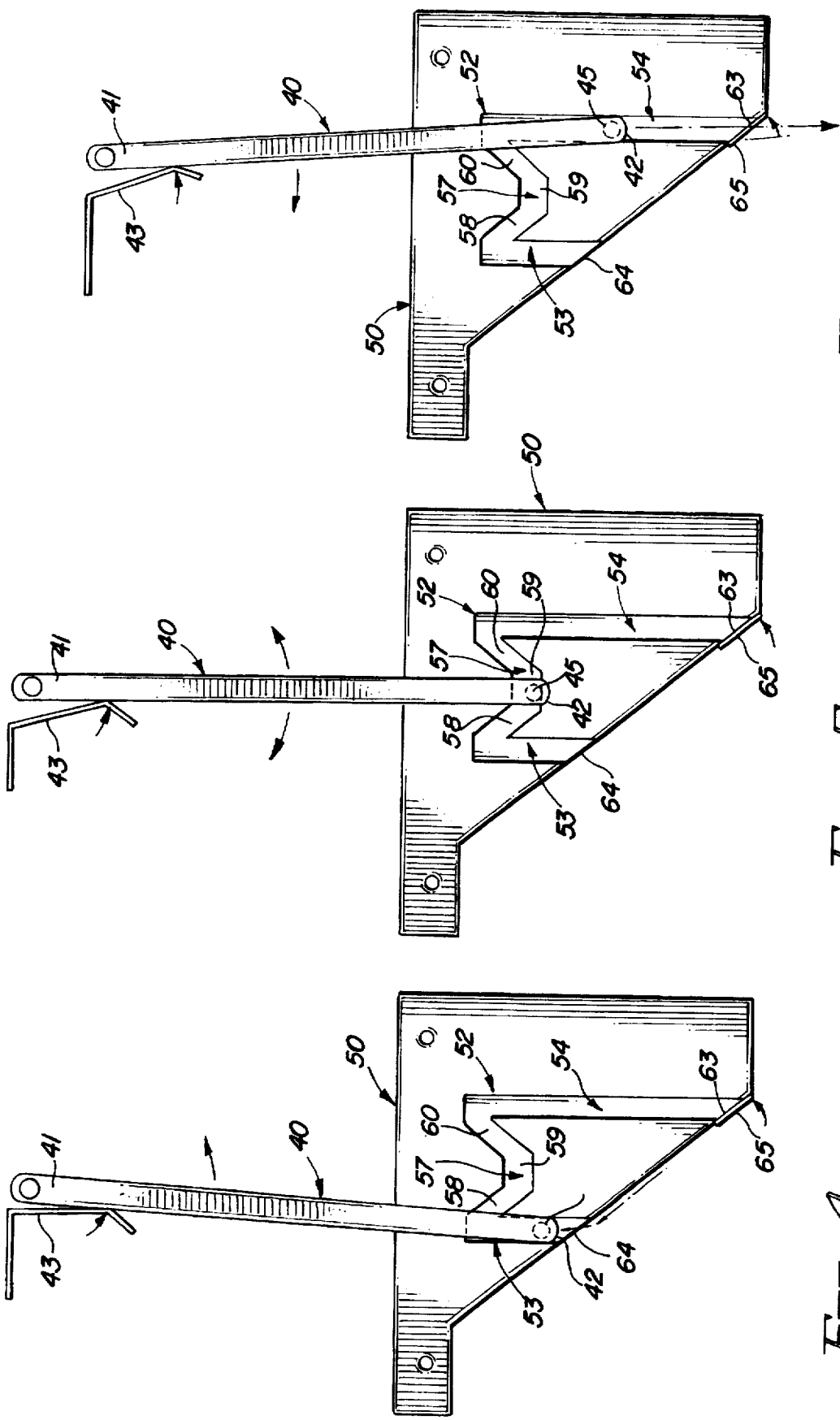

RETRACTABLE ARMREST FOR AN AIRCRAFT SEAT

BACKGROUND OF THE INVENTION

1. Field of the Invention

The present invention relates to an improved, retractable, armrest for an aircraft seat which is comfortably and conveniently disposed for securely supporting a person's arm, but which is also easily and effectively retracted with minimal risk of accidental retraction.

2. Description of the Related Art

A common comfort feature with which a majority of aircraft seats are equipped is a supportive armrest. Specifically, armrests are generally disposed on opposite sides of an aircraft seat in order to allow a passenger to rest his arms supportably thereon, and in some instances, to provide some separation between adjacent aircraft seats, which may be spaced very closely together. While the benefits provided by the armrests on aircraft seats are generally appreciated, it is often desirable to have the ability to either remove the armrest or to retract the armrest to an out-of-the-way position. Accordingly, a majority of commercial aircraft passenger seats are equipped with retractable armrests, at least between adjacent seats. Conventionally known retractable armrests generally comprise an elongate support member positioned between and extending from adjacent aircraft seat backs, which is typically secured to the seat back frame in a manner that permits it to pivot upwardly and downwardly along an arcuate path. This conventionally known type of armrest is typically pivoted upwardly into a generally retracted position between the adjacent aircraft seat backs and in a generally common plane shared with the seat backs. Unfortunately, however, such conventionally known armrest designs for aircraft seats do not provide complete separation between the seat portions of adjacent aircraft seats, and further, if the aircraft seat is reclined with the armrest in its retracted position between the seatbacks, the armrest will usually remain obtrusively positioned in a generally vertical orientation.

Accordingly, it would be highly beneficial to provide a retractable armrest for an aircraft seat which is structured to move into a retracted position which is out-of-the-way regardless of whether the seat back is disposed in an upright or a reclined attitude. It would be highly preferable to provide a retractable armrest for an aircraft seat which is structured to move between an extended position for supporting a passenger's arms and a retracted position whereby the armrest is retracted downwardly and into a less obtrusive position. Additionally, such a retractable armrest would preferably act as a dividing panel in the extended position, by including panel-like structure and further, would be easily moved into a retracted position alongside the seat base. Ideally, such a retractable armrest would be substantially, if not completely retractable downwardly in the retracted position so as to be even or flush with the seat cushion disposed on the aircraft seat frame. Thus, such an armrest could be effectively utilized on an aircraft seat positioned on an aisle within a commercial aircraft or alternatively, on a private jet or other customized aircraft wherein aircraft seats are often individually positioned as in either case, it would greatly facilitate a passenger's entry into and exit from an aircraft seat.

A further consideration relates to the sturdiness of any such retractable armrest assembly, both in terms of general crashworthiness and in terms of being able to support the weight of a passenger's arms and/or upper body in the extended position. Thus, any such improved, retractable, aircraft seat armrest will need to comply with the rules and regulations of the Federal Aviation Administration relative to crashworthiness, and will typically need to be formed of a high-strength material. At the same time, any such improved retractable armrest assembly should be relatively lightweight and not bulky so as to maximize the fuel efficiency of the aircraft and the limited amount of seat space available within an aircraft. Such concerns may however, conflict with the general desirability of making the armrest substantially easy and uncomplicated to retract, which must also be addressed. For example, if a series of latches or levers were required to be activated in order to move the armrest between an extended position and a retracted position, it would significantly complicate the retraction process and further, would likely make the armrest assembly prone to breakage. It would therefore be ideal if a passenger could simply lift up on the armrest of any such improved assembly when in the extended position in order to release it and dispose it in the retracted position. The potential drawbacks are first, that any such assembly would not be sufficiently sturdy or crashworthy and second, that the armrest will be accidentally released by a passenger out of the extended position. Thus, the mechanism employed to move any such improved retractable armrest assembly between an extended position and a retracted position cannot be so simplistic in design that it would not be sufficiently sturdy nor that it would result in being accidentally released by a passenger. For example, in private aircraft, the aircraft seats are often customized to incorporate a number of comfort features such as a reclining back, a slidable and/or swiveling base, which are generally operated by a plurality of controls, levers and/or switches typically disposed on a section of the armrest. As such, when a passenger wishes to adjust one or more of these comfort features, he typically must manipulate the levers, switch, etc. disposed on the armrest, but in doing so, there is a substantial risk that he will accidently tug or pull on an adjacent switch or lever, or even on the armrest itself. Thus, while it would be beneficial to provide a retractable armrest assembly which can quickly and easily be retracted, such as by merely lifting up on the armrest and releasing it from a locked engagement in the extended position, the structure of the assembly and mechanism permitting movement must be sufficiently sturdy so as to avoid accidental release and to be in general, crashworthy. Furthermore, any such assembly should be substantially easy to return to the extended position and to maintain in a locked engagement in the extended position, while again, preserving the sturdiness of the assembly and mechanism permitting movement thereof. It would also be ideal if any such improved assembly could be moved into the extended position by a passenger's gently yet firmly lifting up on the armrest until it returns to and is locked in place in the extended position.

SUMMARY OF THE PRESENT INVENTION

The present invention is directed towards an improved, retractable, armrest for an aircraft seat which is structured to provide substantial, stable support for the arm or upper body weight of a passenger, while also being substantially easy to retract. The improved, retractable, aircraft seat armrest of the present invention is seen to comprise a mount assembly structured to be fixedly secured to the frame of an aircraft seat, and which includes at least one guide member. The improved, retractable armrest of the present invention is also seen to comprise a retraction assembly. In particular, the retraction assembly includes a generally horizontal support which substantially defines an upper support surface of the armrest. The retraction assembly also includes at least one guide element structured to be slidingly engaged with the guide member of the mount assembly. As such, the guide element and guide member function to guide movement of the retraction assembly, relative to the mount assembly, along a path in a generally vertical plane between an extended position and a retracted position.

The improved, retractable, aircraft seat armrest of the present invention also comprises lock means in order to safely maintain and securely dispose the retraction assembly in the extended position. The lock means are structured and disposed such that when the retraction assembly is disposed in the extended position, the retraction assembly may be gently and yet firmly lifted by a passenger in a generally upward direction in order to automatically release the lock means and permit movement of the retraction assembly into the retracted position. The lock means are also structured and disposed to permit movement of the retraction assembly from the retracted position when a gentle, yet firm lifting movement is applied and into an transitional position where the lock means become engaged and secure the retraction assembly in the extended position.

Furthermore, the improved, retractable, aircraft seat armrest of the present invention also comprises retraction resistance means in order to prevent an accidental release of the lock means upon only a slight, upward pulling of the retraction assembly by a passenger, such as might occur when a passenger manipulates one of various levers or controls that may be disposed on the armrest. Specifically, the retraction resistance means are structured and disposed to generally resist upward movement of the retraction assembly from the extended position when only a slight momentary force is applied. Still, however, the retraction resistance means are structured and disposed so as to not hinder a gentle, yet affirmative lifting of the retraction assembly so as to permit release of the lock means when desired by a passenger.

A primary object of the present invention is to provide an improved, retractable, aircraft seat armrest which is movable between a secure, extended position and a retracted position in which the armrest is substantially out-of-the-way and unobtrusive, regardless of whether the aircraft seat back is disposed in an upright or a reclined attitude.

A feature of the present invention for an improved, retractable, aircraft seat armrest is that it retracts along a generally vertical path and in a generally vertical plane adjacent the aircraft seat base.

It is also an object of the present invention is to provide an improved, retractable, armrest for an aircraft seat which in the retracted position will be generally flush with the aircraft seat cushion, thereby greatly facilitating ingress and egress to the aircraft seat with which it is used.

Another primary object of the present invention is to provide an improved, retractable, aircraft seat armrest which is structured to be quickly and easily retracted by a passenger gently, but affirmatively lifting up on the armrest when in the extended position, and yet, which is simultaneously structured to resist accidental retraction when only a slight, momentary lifting force is applied by a passenger.

Yet another object of the present invention is to provide an improved, retractable, aircraft seat armrest which is formed of a high strength material, which is sturdy and crashworthy, and which will substantially support the arm and/or upper body weight of a passenger when in the extended position, while at the same time, being lightweight, of a manageable size, and conducive to maximizing the fuel efficiency of the aircraft as well as the seating configuration within the aircraft.

A further object of the present invention is to provide a retractable, aircraft seat armrest which is capable of acting as a dividing panel in the extended position for use on adjacently disposed aircraft seats.

Yet another object of the present invention is to provide a retractable, aircraft seat armrest which is fully and effectively retractable, while also being able to effectively and un-obtrusively contain a plurality of control wires and levers associated with operating other comfort features of an aircraft seat on which the invention is utilized.

These and other objects, features and advantages of the present invention will become more apparent in view of the drawings and the following description of a preferred embodiment.

BRIEF DESCRIPTION OF THE DRAWING

For a fuller understanding of the nature of the present invention, reference should be had to the following detailed description taken in connection with the accompanying drawings in which:

FIG. 4-6 are sequential, isolated views of the lock means of the present invention in which:

FIG. 4 illustrates movement from a retracted position and towards a transitional position prior to a locked engagement in an extended position;

FIG. 5 illustrates a locked engagement in the extended position; and

FIG. 6 illustrates movement from the locked engagement of the extended position and into the retracted position.

Like reference numerals refer to like parts throughout the several views of the drawings.

DETAILED DESCRIPTION OF THE PREFERRED EMBODIMENTS

Figure 1:
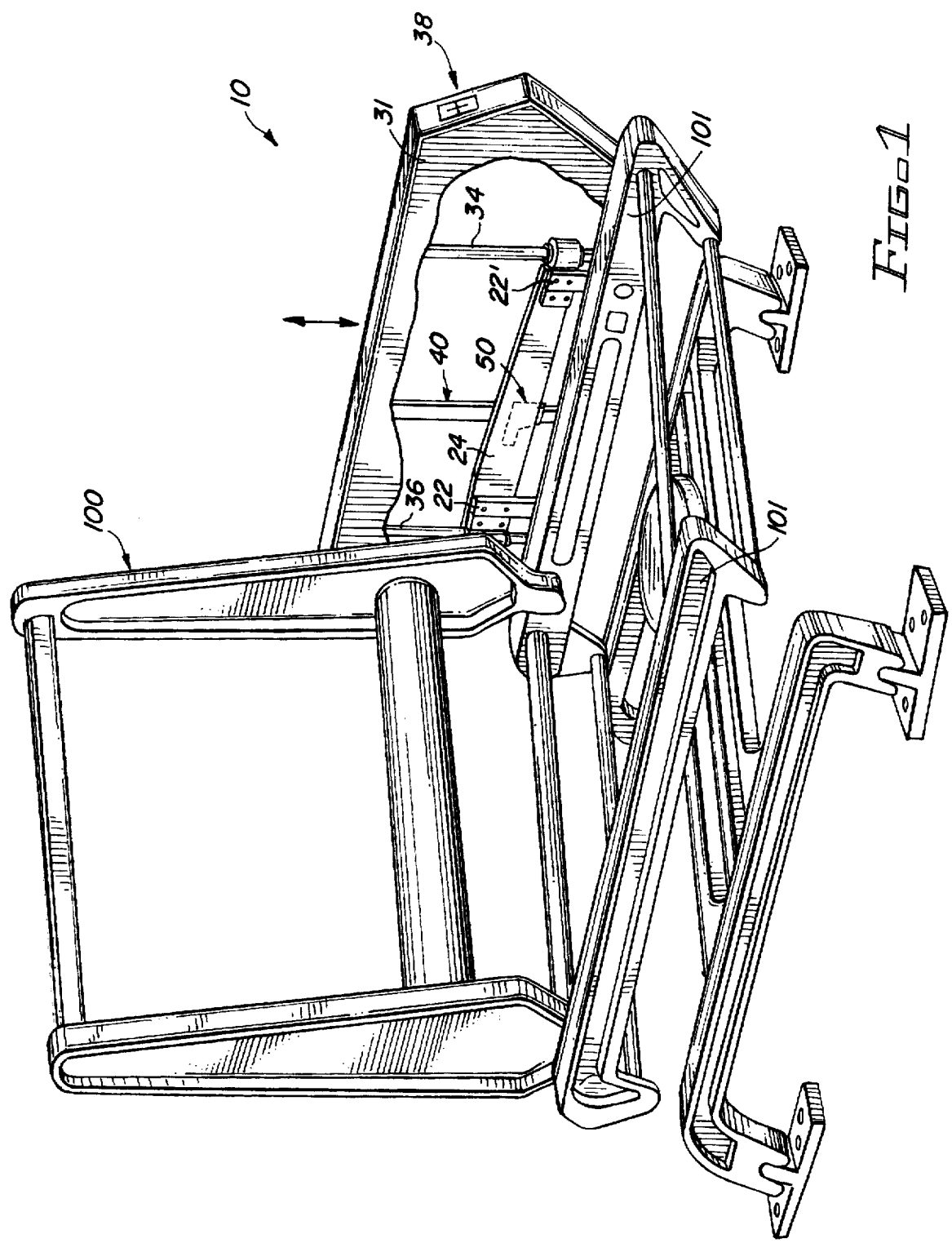
FIG. 1 is a perspective, partial cut away view of the armrest of the present invention in fully assembled form and operably connected to an aircraft passenger seat.

As illustrated in FIG. 1, the present invention is directed towards an improved, retractable, armrest for an aircraft seat, and is generally indicated by the number 10. The armrest 10 is structured to be implemented on either a conventionally known commercial aircraft seat or on a customized aircraft seat for use on a private aircraft, and is preferably mounted to one or both side supports 101, 101' of the aircraft seat frame 100.

Figure 2:
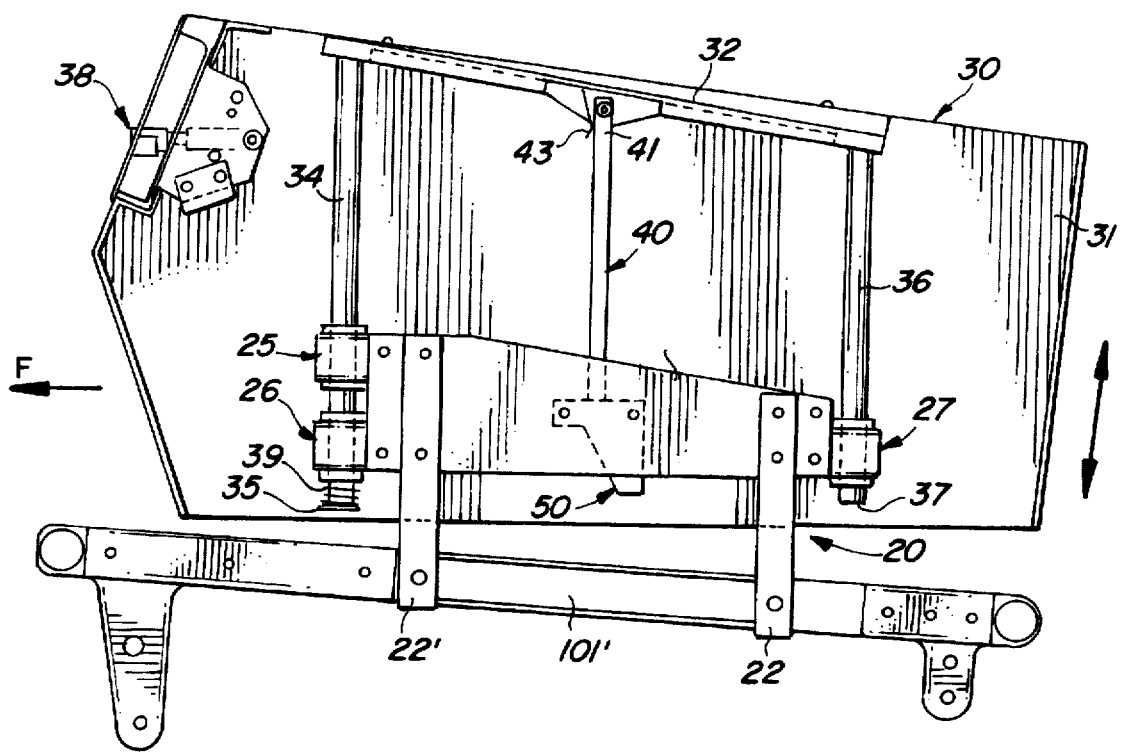
FIG. 2 is an interior plan view of the retractable aircraft seat armrest of the present invention illustrated in an extended position.
Figure 3:
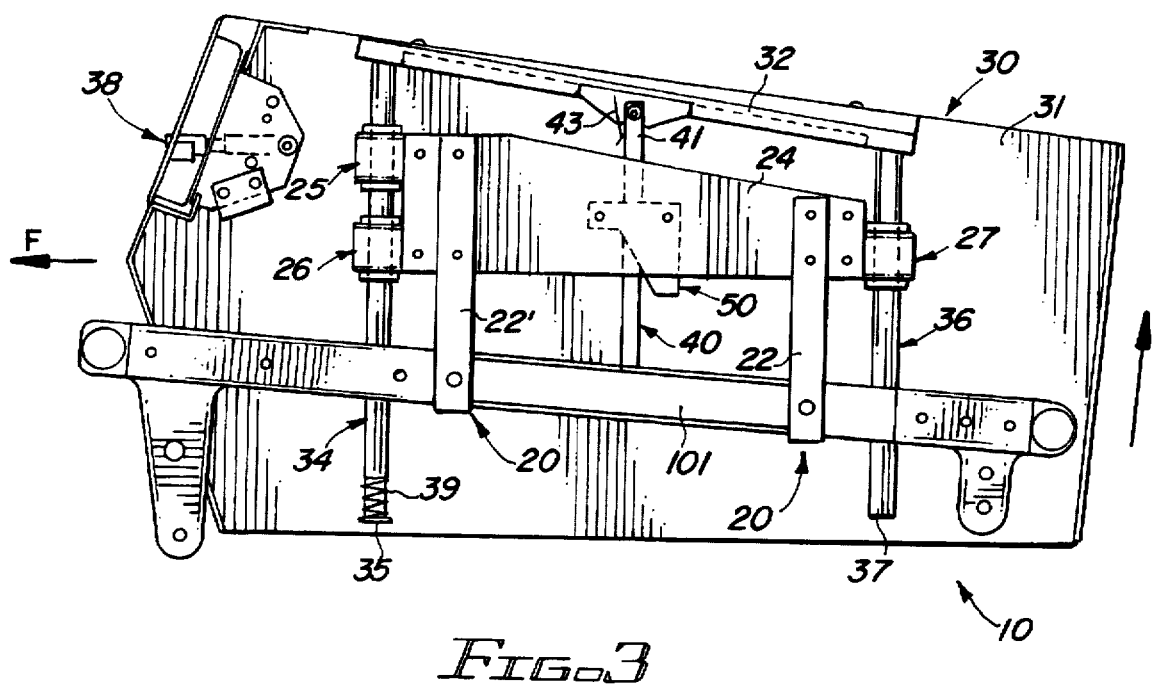
FIG. 3 is an interior plan view of the retractable aircraft seat armrest of the present invention illustrated in a retracted position.

Referring now to FIGS. 2 and 3, the retractable armrest 10 is seen to comprise a mount assembly, generally indicated as 20. The mount assembly 20 is structured to be fixedly secured to one of the side supports 101, 101' of the aircraft seat frame 100. In the preferred embodiment, and as illustrated in FIGS. 2 and 3, the mount assembly 20 includes at least one, but preferably a pair of spaced-apart support arms 22, 22'. The support arms 22, 22' which are constructed of a high strength, rigid, material which is preferably also light-weight, are in the preferred embodiment bolted to the side support 101', see FIG. 2 and extend generally vertically upward therefrom. Further included as part of the mount assembly 20 is at least one, but preferably, a plurality of guide members 25, 26 and 27. The guide members 25, 26, and 27, which are explained more thoroughly below, are disposed such that at least one of the guide members, such as 27, is positioned a spaced-apart distance from the remaining guide members, such as 25, 26. Additionally, in the preferred embodiment, the support arms 22, 22' are spanned by a generally horizontal support bracket 24. The support bracket 24 functions to provide greater stability to the invention as well as to facilitate manufacturing and/or assembly of the invention 10. As illustrated in FIG. 2, the support bracket 24 is structured and disposed such that the guide members 25, 26 and 27 may be correspondingly and operably connected or secured at opposite ends thereof.

Still referring to FIGS. 2 and 3, the retractable aircraft seat armrest 10 further comprises a retraction assembly, generally indicated as 30. The retraction assembly 30 is structured and disposed to move relative to the mount assembly 20, and therefore, relative to a corresponding side support, such as 101' of the seat frame 100. The retraction assembly 30 includes a generally horizontal support 32 which defines an upper support surface of the retraction assembly 30 and which may include a general external framework having padding and the like. In the preferred embodiment, the generally horizontal support 32 comprises an internally disposed, elongate support member, which preferably extends along a substantial portion of the length of the retraction assembly 30, as depicted in FIG. 2, and further, defines a rigid upper support surface for supporting part of a passenger's weight thereon. The retraction assembly 30 also includes at least one, but preferably a pair of guide elements 34 and 36 which extend generally vertically and downwardly from the horizontal support 32. As depicted in FIGS. 1 and 2, the guide elements 34 and 36 are structured to be slidably and matingly engaged with the guide members 25, 26 and 27 of the mount assembly 20. As such, the guide elements 34 and 36 function to guide movement of the retraction assembly 30 along a path in a generally vertical plane, relative to the mount assembly 20. In the preferred embodiment, the guide elements 34 and 36 each includes a substantially strong, rigid and elongate rod 34 and 36. Moreover, the guide members 25, 26 and 27 preferably include individual collar segments, each defined by a linear ball bearings. As such, the guide elements 34 and 36 essentially ride through the guide members 25, 26 and 27 smoothly, with minimal friction and permit facilitated, vertical movement of the retraction assembly 30 relative to the mount assembly 20, while eliminating wobbling and generally maintaining stability therebetween, especially when the retraction assembly 30 is being used to support a passenger's arm or upper body weight. Further, and as illustrated in FIGS. 2 and 3, it is preferred that a pair of the guide members, such as 25 and 26, be disposed a spaced-apart, axially aligned, distance from one another at the forward end F, of the support bracket 24 of the mount assembly 20. This orientation is preferred because in most instances, the downward, leaning force exerted by a passenger while sitting down or getting up will be directed toward the forward end and thus, greater stability and reinforcement is therefore ideally positioned at the forward end of the mount assembly 20.

From the foregoing description, it will be appreciated that the retraction assembly 30 of the present invention is structured to move along a path in a generally vertical plane between an extended position, as illustrated in FIG. 2, and a retracted position as illustrated in FIG. 3. In the extended position, the retraction assembly 30 is elevated sufficiently over the seat portion of the aircraft seat frame 100 and preferably, to provide an arm support disposed at a comfortable height for a passenger seated within the aircraft seat. Conversely, in the retracted position, the retraction assembly 30 is preferably disposed in an out-of-the-way location that is even or flush with a surface of the aircraft seat cushion disposed on the aircraft seat frame 100, or perhaps even below that surface. Additionally, the retraction assembly 30 may include a shroud or covering 31, see FIG. 1 or 2, so as to provide a generally even, attractive, aesthetic exterior appearance. The shroud or covering 31 is preferably secured to the generally horizontal support 32 and while essentially defining the overall shape of the retraction assembly 30, also functions to contain within it any mechanisms, controls and/or wiring necessary to operate other features of the aircraft seat which may be disposed on the armrest. More specifically, and as should be apparent from FIG. 1–3, the retractable armrest of the present invention provides a complete unit with panel-like structure extending from the upper support portion to the side supports of the frame 100, and for this reason, a plurality of control wires can be effectively concealed therein by the shroud 31. Moreover, as illustrated in FIGS. 2 and 3, the shroud or covering 31, which preferably has a rigid or somewhat stiff configuration can also function as a convenient mount for various other utility items, such as headphone connectors, or various other types of levers 38 such as for reclining the aircraft seat, sliding the aircraft seat forward or backward or swiveling the aircraft seat.

Referring now to FIGS. 4, 5 and 6, the improved, retractable aircraft seat armrest 10 of the present invention is also seen to comprise lock means. The lock means are specifically structured to lock and maintain the retention assembly 30 securely and firmly in place in the extended position. Thus, the lock means permit the retractable, aircraft armrest of the present invention to effectively support part or all of a passenger's weight in the extended position. However, the lock means are also structured and disposed so as to be capable of being released without difficulty, by a passenger in order to move the armrest into the retracted position. To achieve this, the lock means comprise in the preferred embodiment, a lock rod 40, also seen in FIGS. 2 and 3. The lock rod 40 is generally elongate and is pivotally secured at an upper end 41 thereof to the retraction assembly 30. In particular, the lock rod 40 is pivotally secured at the horizontal support 32, preferably near a central portion thereof, such that it extends downwardly towards the mount assembly 20 while being able to pivot relative to the horizontal support 32. As seen throughout FIGS. 4–6, the lock rod 40 is preferably engaged by a biasing element 43 such as a spring operably connected to horizontal support 32 in a suitable location, which is structured and disposed to normally bias and pivot the lock rod 40 towards a rear portion of the mount assembly 20. The lock means further comprise a retention segment 45 disposed at the free lower end 42 of the lock rod 40. The retention segment 45, which is preferably operably connected to lock rod 40 and formed so as to protrude at a generally right angle to or perpendicularly from the lock rod 40, preferably includes either a rounded nub or guide pin for guiding movement of the lock rod 40, as is about to be explained. In particular, the lock means are also seen to comprise a guide assembly 50 having a guide track 52 formed therein, and the retention segment 45 of the lock rod 40 is structured to nest within guide track 52 and yet ride within guide track 52. With reference to FIG. 2, it will be understood that the guide assembly 50 is preferably a rigid member, also formed of a high strength material that is securely mounted to the support bracket 24 of the mount assembly 20. As such, the guide assembly 50 provides substantial strength and supportability to the retention segment 45, and therefore as well to the lock rod 40.

Still referring to FIGS. 4, 5 and 6, the guide track 52 defined within the guide assembly 50 is seen in a preferred embodiment to include three track regions, which together, can be said to form generally "M" shaped configuration. More specifically, the guide track 52 includes the following, primarily three track regions: an entry track 53, an exit track 54, and a central retention region 57. Generally, when the retraction assembly 30 is disposed in the retracted position, the retention segment 45 of the lock rod 40 is preferably disposed outside and not within the guide track 52. At other times, however, and particularly when the lock means are about to be engaged or released, the retention segment 45 rides slidingly within and through the guide track 52. Specifically, when a passenger desires to move the retraction assembly from the retracted position and into the extended position, he pulls up on the retention assembly 30 which causes the retention segment 45 to ride up a lower slope 62 of the guide assembly 50 until it reaches an entry aperture 64 leading into the entry track 53. Accordingly, the upward pulling of the retraction assembly 30 by the passenger results in the retention segment 45 riding into and up the entry track 53 until a point where the entry track 53 meets the central retention region 57. This transitional position or point up to which the entry track 53 extends, and up to which the retraction assembly 30 is generally lifted by a passenger, is slightly higher than the point at which the assembly is maintained when in the extended position, as will become clear from the following explanation. Thus, upon the retention segment 45 arriving at a top end of the entry track 53, the normal bias exerted on the lock rod 40 by the biasing element 43 urges the retention segment into the central retention region 57, where it will drop when the passenger discontinues the lifting of the retraction assembly 30. In particular, the central retention region 57 is preferably divided into a generally downwardly angled entry slope 58, a central engagement area 59 and a generally upwardly angled exit slope 60. As best illustrated in FIG. 5, when the passenger discontinues the lifting of the retraction assembly 30 and the retention segment 45 enters the entry slope 58 of the central retention region 57 due to the biasing force exerted thereon by biasing element 43, it causes the retention segment 45 to slide into and settle within the central engagement area 59 of the central retention region 57. While the retention segment 45 is retained and supported within the central retention region 57, the lock rod 40 is maintained in an elevated position such that it will supportingly hold the horizontal support 32, to which the lock rod 40 is secured, and therefore the retraction assembly 30 in the extended position. From this it can be seen that the lock rod 40 and retention segment 45 should be rigid and formed of a high strength material, as they will bear the weight of the retraction assembly 30 and any weight placed on the retraction assembly 30 by the passenger. Moreover, the normal weight of the retraction assembly 30 and the upward angle of the exit slope 60 ensure that the retention segment 45, even under the normal bias exerted by bias element 43 on the lock rod 40, will not accidentally move up and out of the central retention region 57, and a secure, stable, supported engagement is maintained.

When a passenger wishes to move the retraction assembly 30 from the retracted position and into the extended position, the lock means are structured and disposed to achieve this result upon a gentle but affirmative lifting of the retraction assembly 30 which effectuates a release of the lock means. Specifically, and as illustrated in FIG. 6, when the retraction assembly 30 is lifted upwardly from its extended position, the lock rod 40, and therefore the retention segment 45 are also lifted upwardly and further, due to the normal bias exerted on the lock rod 40, the retention segment 45 will ride up the exit slope 60 of the central retention region 57 until it reaches and enters the exit track 54. At that point, the retraction assembly 30 can be substantially if not completely released by the passenger, as the retention segment 45 will slide down the exit track 54, exiting the exit track 54 through a lower outlet 63 thereof, thereby resulting in the retraction assembly 30 being dropped into the retracted position.

As illustrated throughout FIGS. 4, 5 and 6, the lock means of the present invention preferably include a biased flap 65 which prevent the retention segment 45 from accidentally entering the exit track 54 upon a passenger's lifting of the retraction assembly 30 in order to return the retraction assembly 30 to the extended position. The biased flap 65 is preferably disposed over the lower outlet 63 of the exit track 54 and is pivotally secured in place and thereby allows the retention segment 45 to exit therethrough without permitting re-entry into exit track 54 through lower outlet 63. Moreover, the biased flap 65 further functions to guide the retention segment 45 up the lower slope 62 of the guide assembly 50 towards the entry aperture 64 of the entry track 53 in order to re-initiate locked engagement of the retraction assembly 30 in its extended position.

It is therefore evident, that once the retraction assembly 30 is disposed in its extended position shown in FIG. 5, the retraction assembly 30 must be lifted by a passenger with a force that is sufficient to raise the retention segment 45 only a short length corresponding the exit slope 60 of the central retention region 57 in order to release the lock means and permit movement of the retraction assembly 30 into the retracted position. As has been explained however, an aircraft seat often includes various other comfort features for which, levers and switches 38 may be disposed on the armrest and which must be activated to operate such features. In manipulating one of these levers, a passenger will sometimes pull on the retraction assembly 30 slightly in an upward direction, which in some instances could be sufficient to lift the retraction assembly 30 slightly, accidentally release the lock means and abruptly retract the retraction assembly 30. More particularly, although the lower ends 35 and 37 of the guide elements 34 and 36 are generally configured to prevent the guide elements 34 and 36 from passing completely through the guide members 25, 26 and 27 to result in a disengagement of the retraction assembly 30 from the mount assembly 20, some amount of clearance must still be provided to permit the retraction assembly 30 to be lifted slightly from the extended position and release the lock means when actually desired by the passenger. In order to solve these problems, the retractable aircraft seat armrest 10 of the present invention further includes retraction resistance means, best shown in FIG. 2. Specifically, the retraction resistance means are structured and disposed to resist a slight, momentary upward movement of the retraction assembly 30 while in the extended position, and thereby ensure that only when a passenger affirmatively lifts up on the retraction assembly 30 will the lock means, holding it in the extended position, be released. In the preferred embodiment, and as depicted in FIG. 2, the retraction resistance means of the present invention comprise biasing means, preferably in the form of a spring 39, disposed at the lower end 35 of one of the guide elements 34. Specifically, the spring 39 is structured and disposed so as to generally abut a lower guide member, such as 26, of the mount assembly 20 when the retraction assembly 30 is disposed in the extended position. As such, when the retraction assembly 30 is lifted in order to disengage the lock means, the biased resistance of the spring 39 must be overcome and the spring 39 compressed in order for the upward movement to be of sufficient force to initiate movement of the retraction assembly into the retracted position. Accordingly, a slight, momentary pulling movement on the retraction assembly 30, such as would typically occur when a passenger manipulates a lever 38, will be insufficient to compress the spring 39 and lift the retraction assembly 30 to the point of releasing the lock means. When, however, a passenger actually wants to retract the armrest, a gentle yet focused lifting action on the retraction assembly 30 will be sufficient to overcome the resistance provided by the spring 39.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,
What is claimed is:

1. An improved, retractable armrest for an aircraft seat of the type including a frame, said improved, retractable armrest comprising:

a mount assembly, said mount assembly being adapted to be fixedly secured to the frame of the aircraft seat, said mount assembly including at least one guide member, a retraction assembly, aid retraction assembly including a generally horizontal support structured to generally define an upper support surface, said retraction assemble further including at least one guide element structured to b slidably engaged with said guide member of said mount assembly so as to guide generally vertical movement of said retraction assembly relative to said mount assembly between an extended position and a retracted position, lock means for locking said retraction assembly in said extended position, said lock means being releasable so as to permit movement of said retraction assembly into said retracted position upon a gentle but affirmative lifting force being applied to said retraction assembly when in said extended position, retraction resistance means for resisting a slight, momentary upward movement of aid retraction assembly from said extended position so as to prevent accidental release of said lock means, while still permitting facilitated release of said lock means, and said lock means comprising:

a lock rod pivotally secured to said retraction assembly and structured and disposed to extend towards said mount assembly, a retention segment protruding outwardly from generally a lower end of said lock rod, a guide assembly operably coupled to said mount assembly, said guide assembly including a guide track structured and disposed to receive said retention segment of said lock rod slidably therein, said guide track being further structured to retain said retention segment of said lock rod in an elevated position, and thereby maintain said retraction assembly to which said lock rod is s cured in said extended position, until said retraction assembly, and therefore said retention segment of said lock rod, are lifted relative thereto to release the retention thereof from with said guide track, said guide track including an entry track, a central retention region, and an exit track, and said guide track further including a biased flap disposed over an outlet of said exit track and structured to permit said retention segment to exit said exit track therethrough without permitting re-entry of said retention segment into said exit track therethrough.

2. An improved, retractable armrest as recited in claim 1 wherein said mount assembly includes a pair of said guide members disposed a spaced apart distance from one another.

3. An improved, retractable armrest as recited in claim 2 wherein each of said guide members includes a collar segment.

4. An improved, retractable armrest as recited in claim 3 wherein said collar segment includes a linear bearing.

5. An improved, retractable armrest as recited in claim 2 wherein said retraction assembly includes a pair of said guide elements disposed a spaced apart distance from one another, each of said guide elements structured to be slidably engaged with a corresponding one of said guide members.

6. An improved, retractable armrest as recited in claim 5 wherein each of said guide elements includes an elongate rod.

7. An improved, retractable armrest as recited in claim 6 wherein said elongate rod extends through a collar segment of each of said guide members.

8. An improved, retractable, aircraft seat armrest as recited in claim 5 wherein said retraction assembly is further structured and disposed to form a divider panel.

9. An improved, retractable armrest as recited in claim 8 further comprising a shroud covering said retraction assembly.

10. An improved, retractable armrest as recited in claim 1 wherein said retraction resistance means includes biasing means disposed on said guide element and structured to abut said guide member and resist compression upon said retraction assembly, and therefore said guide element, being pulled upwardly.

11. An improved, retractable, aircraft seat armrest as recited in claim 8 wherein said biasing means includes a spring disposed on a lower end of said guide element.

12. An improved, retractable, aircraft seat armrest as recited in claim 1 wherein said guide track defines a generally M-shaped configuration.

13. An improved, retractable, aircraft seat armrest as recited in claim 1 wherein said extended position is defined by said retention segment disposed in said central retention region.

14. An improved, retractable, aircraft seat armrest as recited in claim 11 wherein aid lock rod is structured to be normally biased towards said exit track.

15. An improved, retractable, aircraft seat armrest as recited in claim 14 wherein said retention segment of said lock rod is structured to ride up said entry track, upon said retraction assembly and therefore said lock rod being pulled upwardly, until said normal bias of said lock rod urges said retention segment into said central retention region where said lock rod is retained in said elevated position upon release of said retraction assembly.

16. An improved, retractable, aircraft seat armrest as recited in claim 15 wherein s id lock rod is further structured to ride up said central retention region and into said exit track upon said retraction assembly, and therefore said lock rod, being lifted upwardly from said extended position, such that subsequent release of s id retraction assembly results in said retention segment riding down and out off said exit track and said retraction assembly dropping into said retracted position.

17. An improved, retractable, aircraft seat armrest as recited in claim 16 wherein said biased flap is further structured to guide said retention segment into said entry track upon said retraction assembly, and therefore said lock rod, being lifted upwardly from said retracted position.

* * * * *